Figure 1:
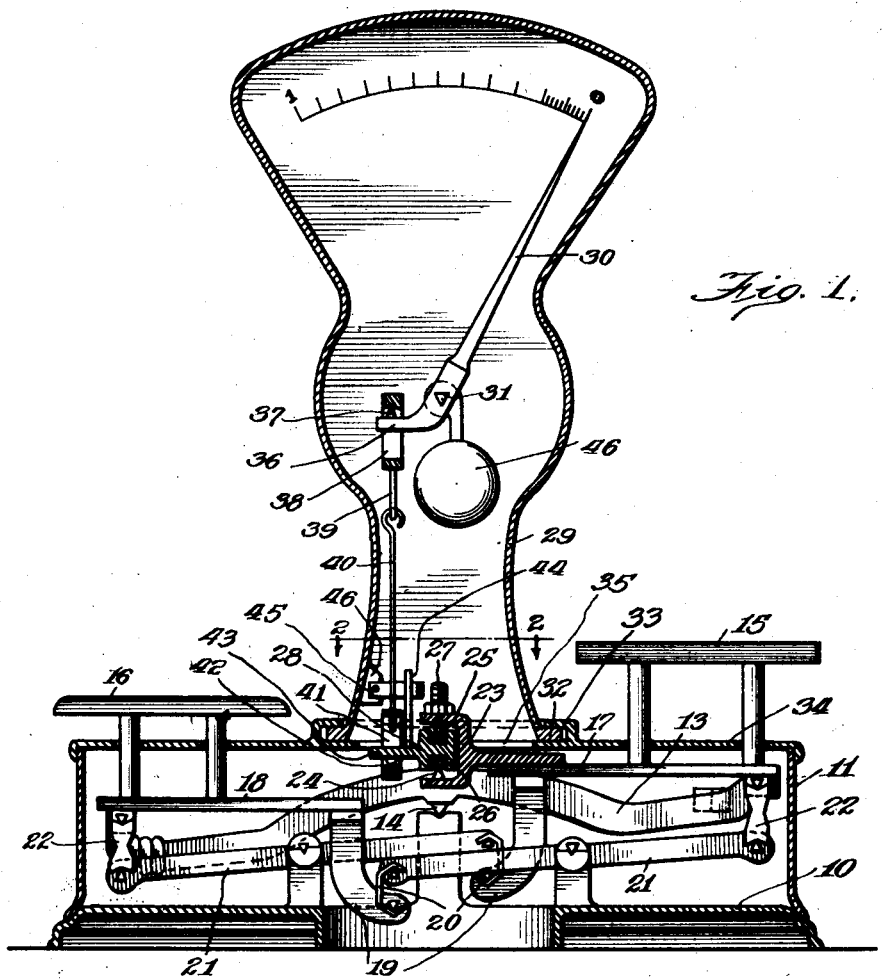

Oct. 7, 1930.    A. VAN DUYN    1,777,537

WEIGHING SCALE

Filed July 11, 1927

Inventor:
Adrianus van Duyn
By Nissen & Crane
Attys

Patented Oct. 7, 1930

1,777,537

UNITED STATES PATENT OFFICE

ADRIANUS van DUYN, OF ROTTERDAM, NETHERLANDS, ASSIGNOR TO NAAMLOOZE VENNOOTSCHAP MAATSCHAPPIJ TOT VERAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

WEIGHING SCALE

Application filed July 11, 1927, Serial No. 204,745, and in Germany July 31, 1926.

This invention relates to scale mechanism and especially to rapidly operating scales having casings provided with base and upright portions, and has for one of its objects the provision of a scale in which the upright portion of the scale frame or housing may be rotated relative to the base portion while maintaining substantially the same distance between the upright housing and the scale pans.

Other objects and advantages will appear from the following description.

The invention is exemplified in the combination and arrangement of parts shown in the accompanying drawings and described in the following specification, and it is more particularly pointed out in the appended claims.

In the drawings—

Figure 2:
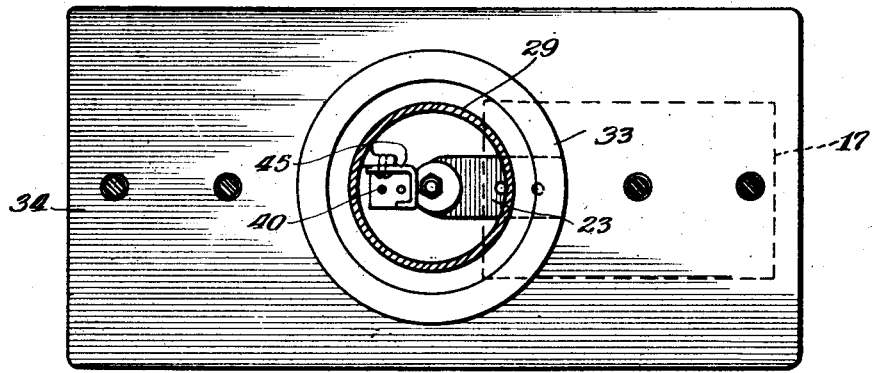

Fig. 1 is a vertical sectional view of a weighing scale showing one embodiment of the present invention; and Fig. 2 is a horizontal section substantially on line 2—2 of Fig. 1.

In the embodiment illustrated, the numeral 10 designates the base of a scale frame having a housing 11 which encloses the lever mechanism. The lever mechanism may consist of a scale beam 13 balanced on a knife edge 14 and supporting scale pans 15 and 16. The scale pans 15 and 16 are mounted on platforms 17 and 18, respectively, connected with link and lever mechanism for holding the platforms in a substantially horizontal position. The inner ends of the platforms are supported on arms 19 which are suspended by links 20, the links being carried on the ends of lever arms 21 controlled by struts 22 interposed between the lever arms 21 and the respective ends of the scale beam 13.

The lever mechanism within the housing 11 also includes a bearing member 23 fixed to the inner end of the platform 17 carrying bearing points 24 and 25 which engage bearings 26 and 27 in a pivoted bearing block 28. The pivotal axis of the bearing block 28 coincides with the vertical axis of the upper casing member 29 which encloses the indicator arm 30 and its knife edge support 31. The vertical axis of the bearing member 28 may pass through the fulcrum of the knife edge 31. The upper housing member 29 is provided with a circular flange 32 rotatably mounted in a retaining flange 33 on the lower housing member 11. The top plate 34 of the housing member 11 is provided with an opening 35 through which the lever mechanism of the scale is connected to the indicator.

The indicator 30 is provided with a laterally extending arm 36 having a knife edge 37 which supports a yoke 38. A link 39 is swiveled to the yoke 38 and connected by a link 40 to a yoke 41. The yoke 41 engages a knife edge 42 on an arm 43 projecting from the bearing member 28. A pin 44 extends upwardly from the arm 43 and engages a stirrup 45 connected to a bracket 46 on the upper housing 29. When the pan 15 is moved downwardly the bearing member 28 and arm 43 will be moved downwardly in unison therewith and will exert a downward pull on the rod 40 to swing the indicator 30 to the left, as viewed in Fig. 1, against the counterbalancing effect of the weight 46. If it is desired to rotate the upper housing 29 relative to the base so that it may be read from a different angle or for any other purpose, this may be done simply by moving the upper housing about its vertical axis. The movement of the stirrup 45 will operate through the pin 44 to swing the arm 43 about the axis of the bearings 24 and 25. Even if the stirrup is omitted the arm 43 will be swung in unison with the housing 25, because the yoke 38 is carried on the arm 36 which swings with the upper housing.

It will be noted that the axis of rotation of the connection between the lever mechanism and the indicator is displaced laterally relative to the connecting rod 40. The connecting rod 40 is naturally displaced at one side of the axis of the housing 29. A simple swivel connection in the rod 40 would permit rotation of the upper housing 29 if the axis of rotation were made to coincide with the rod, but since the rod 40 is eccentric to the upper housing it is apparent that rotation about the axis of this rod would shift the upper housing bodily relative to the scale pans. Applicant has avoided this difficulty by providing a pivotal connection in the transmission train which is displaced laterally relative to the connecting link of the train.

I claim:—

1. In a weighing scale, a base frame member, an upper frame member, lever mechanism for said scale disposed in said base frame member, indicating mechanism for said scale disposed in said upper frame member, and a connecting member extending upwardly from said lever mechanism to said indicating mechanism, said upper frame member being mounted to rotate relative to said base frame member about an axis spaced from the axis of said connecting member.

2. A weighing scale comprising a lower casing member, an upper casing member mounted to rotate about a vertical axis relative to said lower casing member, lever mechanism disposed in said lower casing member, an indicator pivotally mounted in said upper casing member, and a connecting member displaced laterally from the pivotal mounting of said indicator and operatively connecting said lever mechanism and said indicator, said connecting member being displaced laterally from the vertical axis of rotation of said upper casing member.

3. A weighing scale comprising a lower casing member having lever mechanism mounted therein, an upper casing member, an indicator pivotally mounted in said upper casing member, and a link connecting said indicator and said lever mechanism, said upper casing member being mounted to rotate about a vertical axis on said lower casing member, said link being rotatable with said upper casing member about said vertical axis.

4. A weighing scale comprising a lower casing, an upper casing mounted to rotate about a vertical axis on said lower casing, balance mechanism disposed in said lower casing, an arm pivotally connected with said balance mechanism for rotation about a vertical axis coinciding with the axis of rotation of said upper casing, an indicator mounted in said upper casing, and a link connecting said indicator and arm, said link being rotatable with said arm about the axis of rotation of said arm.

5. A weighing scale comprising a lower casing, an upper casing mounted on said lower casing and rotatable thereon about an upright axis, lever mechanism disposed in said lower casing and having a vertically movable member, an arm pivotally connected with said vertically movable member for rotation about the axis of rotation of said upper casing a link connected with said arm at a point spaced from the axis of rotation thereof, means on said upper casing for constraining said arm and link to rotate with said casing about the upright axis of rotation of said casing, and an indicator mounted in said upper casing and connected with said link and operated thereby.

6. A weighing scale comprising a lower casing, balance mechanism mounted in said lower casing and having a weight-actuated vertically movable member, a horizontally swinging arm pivotally connected with said weight-actuated vertically movable member for rotation about an upright axis, an upper casing mounted on said lower casing and rotatable thereon about the axis of rotation of said horizontally swinging arm, a stirrup having pivotal connection with said horizontally swinging arm at a point spaced from said upright axis an indicator pivotally mounted in said upper casing and having its pivotal axis intercepting the axis of rotation of said upper casing, a stirrup pivotally connected with said indicator at a point spaced from said upright axis of rotation, and a link connecting said stirrups.

In testimony whereof I have signed my name to this specification on this 13th day of June, A. D. 1927.

ADRIANUS van DUYN.